United States Patent
Kwon et al.

(10) Patent No.: US 9,397,870 B2
(45) Date of Patent: Jul. 19, 2016

(54) SIGNAL RECEIVING DEVICE FOR MEASURING CHARACTERISTIC OF WIRELESS COMMUNICATION CHANNEL, AND METHOD OF MEASURING CHARACTERISTIC OF WIRELESS COMMUNICATION CHANNEL

(71) Applicant: Electronics and Telecommunications Research Institute, Daejeon (KR)

(72) Inventors: Heon Kook Kwon, Daejeon (KR); Myung Don Kim, Daejeon (KR); Kwangchun Lee, Daejeon (KR); Young Jun Chong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/636,728

(22) Filed: Mar. 3, 2015

(65) Prior Publication Data

US 2015/0288546 A1  Oct. 8, 2015

(30) Foreign Application Priority Data

Apr. 4, 2014  (KR) .................. 10-2014-0040372

(51) Int. Cl.
*H04L 25/06* (2006.01)
*H04L 27/22* (2006.01)
*H04L 1/20* (2006.01)

(52) U.S. Cl.
CPC .............. *H04L 25/061* (2013.01); *H04L 1/206* (2013.01); *H04L 27/22* (2013.01)

(58) Field of Classification Search
USPC ........................................... 375/316
See application file for complete search history.

(56) References Cited

U.S. PATENT DOCUMENTS

| 5,809,060 | A | * | 9/1998 | Cafarella | H04B 1/707 375/146 |
|---|---|---|---|---|---|
| 6,108,367 | A | * | 8/2000 | Herman | G06K 7/0008 375/133 |
| 2011/0150139 | A1 | | 6/2011 | Lee et al. | |
| 2011/0164666 | A1 | * | 7/2011 | De Jong | H03D 7/166 375/224 |

OTHER PUBLICATIONS

Ben-Dor, E. et al., "Millimeter-wave 60 GHz outdoor and vehicle AOA propagation measurements using a broadband channel sounder," IEEE Global Telecommunications Conference, GLOBECOM 2011 (6 pages).

* cited by examiner

*Primary Examiner* — Dac Ha
*Assistant Examiner* — Janice Tieu
(74) *Attorney, Agent, or Firm* — NSIP Law

(57) ABSTRACT

A signal receiving device for measuring a characteristic of a wireless communication channel is provided. The signal receiving device includes an analog signal processor, an analog-digital converter, and a digital signal processor. The analog signal processor generates a band-limited signal by decreasing an intensity of a signal having an image frequency in a correlation operation result signal being a result of correlation operation, and generates an intermediate frequency signal by transforming the band-limited signal. The analog-digital converter converts the intermediate frequency signal into a digital signal. The digital signal processor generates a demodulated signal by performing in-phase/quadrature-phase modulation on the digital signal, the demodulated signal including a baseband signal, which includes a direct current component, and signals repeated at constant frequency intervals with a same bandwidth as the baseband signal, and generates an impulse response signal by decreasing intensities of the repeated signals in the demodulated signal.

15 Claims, 7 Drawing Sheets

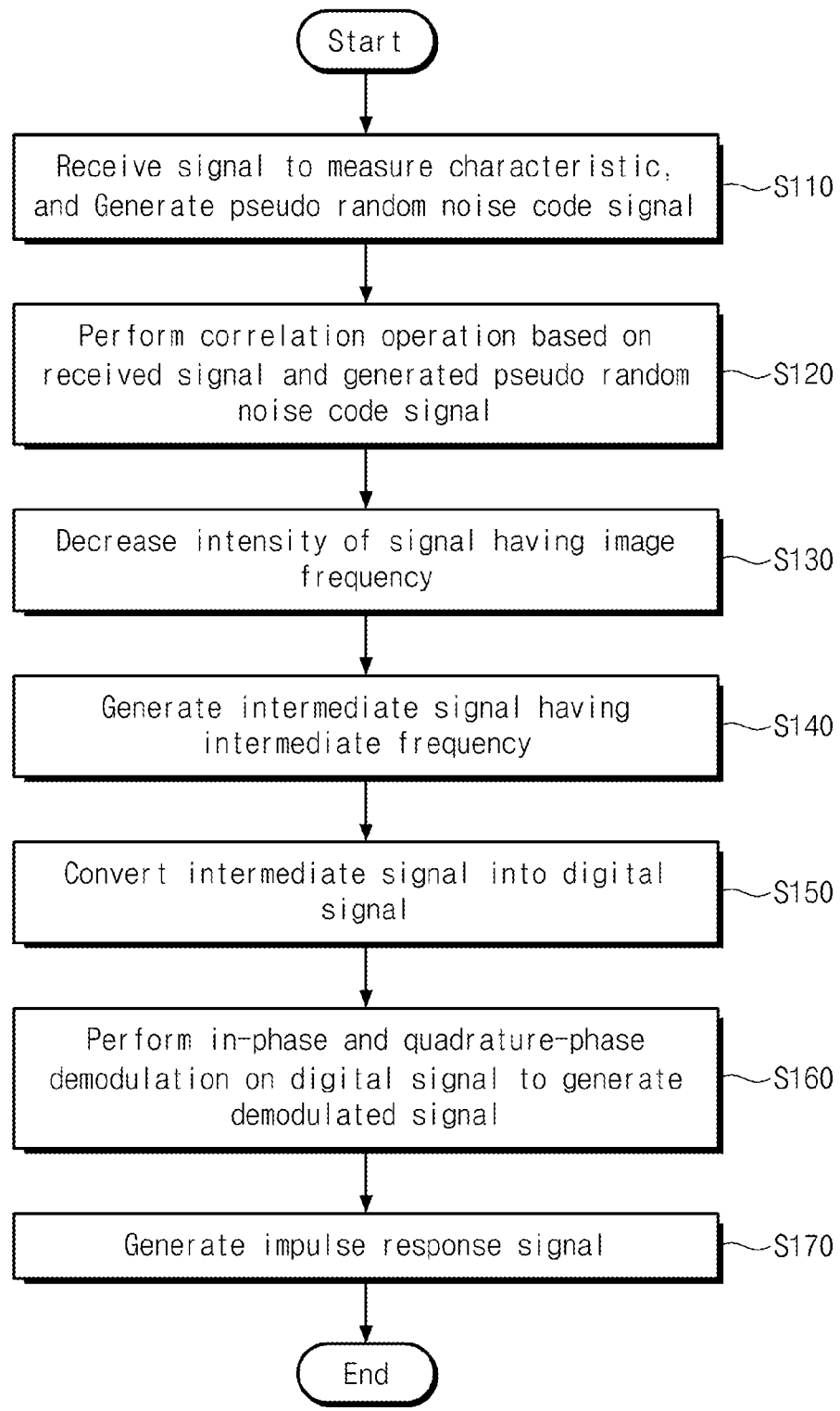

SIGNAL RECEIVING DEVICE FOR MEASURING CHARACTERISTIC OF WIRELESS COMMUNICATION CHANNEL, AND METHOD OF MEASURING CHARACTERISTIC OF WIRELESS COMMUNICATION CHANNEL

CROSS-REFERENCE TO RELATED APPLICATIONS

The present U.S. non-provisional patent application claims priority under 35 U.S.C. §119 to Korean Patent Application No. 10-2014-0040372, filed on Apr. 4, 2014, the entire contents of which are incorporated herein by reference.

BACKGROUND

1. Technical Field

The present disclosure relates to measuring the characteristic of a wireless communication channel, and more particularly, to a signal receiving device for measuring the characteristic of a wireless communication channel with using time dilation (or, sliding correlation) and a method of measuring the characteristic of a wireless communication channel.

2. Description of the Related Art

Recently, a wireless communication system is being widely used with the development of a communication technology and the prevalence of a portable communication device having high performance. A wireless communication channel model is needed for the development of the wireless communication system. The characteristic of the wireless communication channel needs to be measured in order to design the wireless communication channel model. The wave propagation characteristic of the wireless communication channel is measured by using a device for measuring the characteristic of the wireless communication channel. Based on the result of measurement of the characteristic, the affection on a wave passing through the wireless communication channel is figured out. That is, the result of measurement of the characteristic may be used to design the wireless communication channel model.

In particular, the demand for massive multimedia data has significantly increased with the recent prevalence of a portable communication device having high performance, such as a smart phone. Thus, data traffic over a wireless mobile communication network is also sharply increasing. For transmission and reception of a large amount of data, it is expected that a wideband wireless mobile communication network having a bandwidth of about 500 MHz or greater will be utilized. In addition, additional frequencies for the hot spot of the wideband wireless mobile communication network are needed. Thus, a wideband wireless communication channel model for the development of the wideband wireless communication system is needed.

A device for measuring the characteristic of a wireless communication channel that uses time dilation is used to design the wideband wireless mobile communication channel model having a bandwidth of about 500 MHz or greater. Some characteristic measuring devices using time dilation need a filter having a high quality factor characteristic. In particular, some characteristic measuring devices need a narrowband high-frequency band pass filter having a bandwidth of pass band of several tens to hundreds of kHz. However, it is not easy to implement the narrowband high-frequency band pass filter having the bandwidth of pass band of several tens to hundreds of kHz.

Another characteristic measuring device using time dilation uses an analog signal to perform in-phase and quadrature-phase demodulation. In the characteristic measuring device above, an in-phase component signal is, however, transmitted through a different path from a quadrature-phase component signal. Thus, there are errors in signal amplitude and phase due to a path difference. In addition, the characteristic measuring device above may experience a direct current (DC) offset phenomenon that generates a DC component signal affecting a received signal.

SUMMARY

An example embodiment of the present disclosure provides a signal receiving device for measuring the characteristic of a wireless communication channel by using time dilation. In particular, the signal receiving device may be implemented with a filter having a relatively lower quality factor characteristic than another device. In addition, the signal receiving device may perform in-phase and quadrature-phase demodulation on a digital signal.

An example embodiment of the present disclosure provides a signal receiving device configured to measure a characteristic of a wireless communication channel, which includes: an analog signal processor configured to generate a band-limited signal by decreasing an intensity of an image signal having an image frequency, the image signal being included in a correlation operation result signal, the correlation operation result signal being a result of correlation operation performed on a received signal and a pseudo random noise code signal, and generate an intermediate frequency signal by transforming the band-limited signal based on a carrier frequency having an intermediate frequency; an analog-digital converter configured to convert the intermediate frequency signal into a digital signal; and a digital signal processor configured to generate a demodulated signal by performing in-phase and quadrature-phase modulation on the digital signal, the demodulated signal including a baseband signal and repeated signals, the baseband signal including a direct current (DC) component, the repeated signals being repeated at constant frequency intervals with a same bandwidth as the baseband signal, and generate an impulse response signal by decreasing intensities of the repeated signals in the demodulated signal.

An example embodiment of the present disclosure provides a method of measuring a characteristic of a wireless communication channel, which includes: receiving a signal for characteristic measurement; generating a pseudo random noise code signal; performing correlation operation on the received signal and the pseudo random noise code signal to generate a correlation operation result signal; decreasing an intensity of an image signal having an image frequency to generate a band-limited signal, the image signal being included in the correlation operation result signal; transforming the band-limited signal based on a carrier frequency having an intermediate frequency to generate an intermediate frequency signal; converting the intermediate frequency signal into a digital signal; performing in-phase and quadrature-phase modulation on the digital signal to generate a demodulated signal, the demodulated signal including a baseband signal and repeated signals, the baseband signal including a direct current (DC) component, the repeated signals being repeated at constant frequency intervals with a same bandwidth as the baseband signal; and decreasing intensities of the repeated signals in the demodulated signal to generate an impulse response signal.

BRIEF DESCRIPTION OF THE DRAWINGS

The above and other objects and features will become apparent from the following description with reference to the following figures, wherein like reference numerals refer to like parts throughout the various figures unless otherwise specified, and wherein:

FIG. 9 is a flowchart describing a method of measuring the characteristic of a wireless communication channel according to an example embodiment of the present disclosure.

DETAILED DESCRIPTION OF EMBODIMENTS

Both the above-described characteristic and the following detailed description are example matters for helping the description and understanding of the present disclosure. That is, the present disclosure is not limited to example embodiments below and may be embodied in other forms. The following embodiments are examples for fully disclosing the present disclosure and descriptions for conveying the present disclosure to a person skilled in the art to which the present disclosure pertains to. Thus, when there are many methods of embodying the components of the present disclosure, it should be noted that it is possible to embody the present disclosure with a particular one of the methods or any of their equivalents.

When the present disclosure mentions that a component includes (or, comprises) particular elements or that a process includes (or, comprises) particular steps, it means that other elements or steps may be further included. That is, the terms used herein are only to describe a particular example embodiment and are not intended to limit the concept of the present disclosure. Furthermore, example embodiments described to help the understanding of the present disclosure also include their complementary embodiments.

The terms used herein have meanings generally understood by a person skilled in the art to which the present disclosure pertains. Generally used terms should be construed in a consistent meaning according to the context of the present disclosure. Also, the terms used herein should not be construed in an excessively ideal or formal meaning unless their meanings are definitely defined. In the following, example embodiments of the present disclosure are described through the accompanying drawings.

Figure 1:
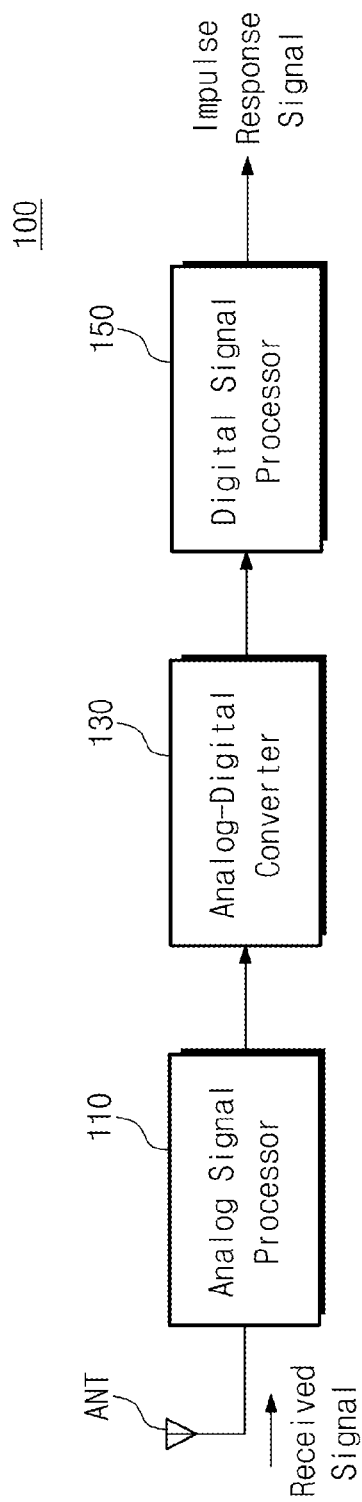
FIG. 1 is a block diagram illustrating a signal receiving device for measuring the characteristic of a wireless communication channel according to an example embodiment of the present disclosure.

FIG. 1 is a block diagram illustrating a signal receiving device for measuring the characteristic of a wireless communication channel according to an example embodiment of the present disclosure. A signal receiving device 100 may include an analog signal processor 110, an analog-digital converter 130, and a digital signal processor 150.

The analog signal processor 110 may receive a signal received by the signal receiving device 100. As an example embodiment, the received signal may be provide through an antenna ANT. The analog signal processor 110 may generate a signal corresponding to a pseudo random noise code. The analog signal processor 110 may perform a correlation operation on the received signal and the pseudo random noise code signal. Herein, a principle indicating that a multiplication operation in a time domain for two signals corresponds to a correlation operation in a frequency domain may be used.

When the correlation operation is performed on the received signal and the pseudo random noise code signal, a correlation operation result signal may be generated. The correlation operation result signal may include an effective correlation operation result signal. The effective correlation operation result signal may include information intended to be obtained by the correlation operation. Furthermore, the correlation operation result signal may include narrowband distribution signals which are repeated at a constant frequency interval with the same frequency bandwidth as the effective correlation operation result signal. Some of the narrowband distribution signals may be interference signals for the effective correlation operation result signal. The interference signals may cause interference in an analog-digital conversion process. The analog signal processor 110 may decrease the intensity of an image signal having an image frequency that may cause interference in the analog-digital conversion process among the correlation operation result signal.

When the intensity of the image signal having the image frequency decreases, a band-limited signal may be generated. The band-limited signal is distributed in a limited frequency band. That is, the band-limited signal may be distributed in a narrower frequency band than the correlation operation result signal. In particular, the band-limited signal may include the effective correlation operation result signal. Since the effective correlation operation result signal does not have the image frequency, the intensity of the effective correlation operation result signal does not decrease in the process of decreasing the intensity of the image signal having the image frequency.

The analog signal processor 110 may transform the band-limited signal based on a carrier frequency having an intermediate frequency. The analog signal processor 110 may transform the band-limited signal to generate an intermediate frequency signal. The intermediate frequency may be selected to have a value suitable for analog-digital conversion. That is, the analog signal processor 110 may transform a narrowband distribution signal to generate the intermediate frequency signal having the intermediate frequency suitable for the analog-digital conversion. The detailed description of the operations of the analog signal processor 110 will be mentioned with reference to FIGS. 2 and 3.

The analog-digital converter 130 may receive the intermediate frequency signal from the analog signal processor 110. The analog-digital converter 130 may convert the intermediate frequency signal into a digital signal. In an example embodiment of the present disclosure, the influence of errors in signal amplitude and phase may decrease by using the digital signal.

The digital signal processor 150 may receive the digital signal from the analog-digital converter 130. The digital signal processor 150 may demodulate the digital signal to generate a demodulated signal. In particular, the digital signal processor 150 may perform in-phase and quadrature-phase demodulation on the digital signal to generate the demodulated signal. The demodulated signal may include a baseband signal. The baseband signal may include a direct current (DC) component. Furthermore, demodulated signals may include signals having the same frequency bandwidth as the baseband signal and repeated at constant frequency intervals. In particular, according to the in-phase and quadrature-phase demodulation, a signal corresponding to the intermediate frequency may be demodulated to a signal corresponding to the DC component included in the baseband signal. In addition, the baseband signal may be generated to include information corresponding to the effective correlation operation result signal.

The digital signal processor 150 may decrease the intensities of other signals (i.e., the repeated signals) excluding the baseband signal among the demodulated signal. Accordingly, the digital signal processor 150 may generate an impulse response signal. The impulse response signal may be used to measure the characteristic of a wireless communication channel through which the signal received through the antenna ANT passes. The detailed description of the operations of the digital signal processor 150 will be mentioned with reference to FIGS. 4 and 5.

Figure 2:
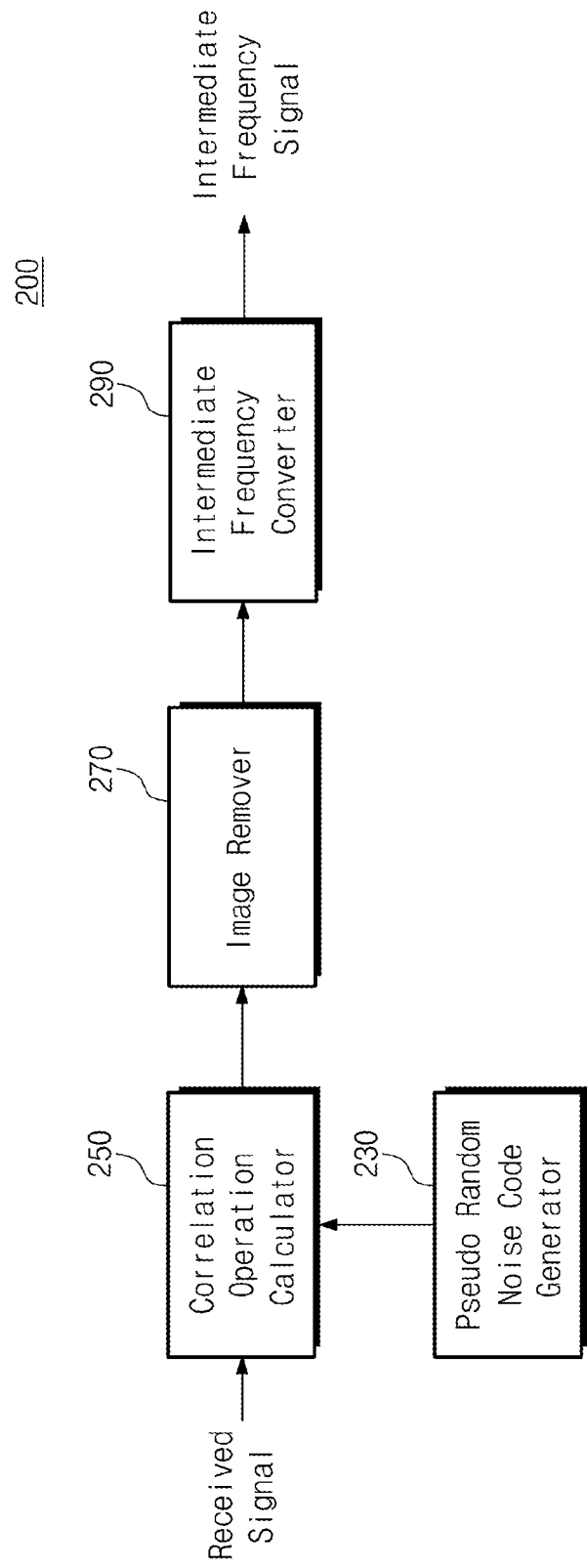
FIG. 2 is a block diagram illustrating an analog signal processor of a signal receiving device according to an example embodiment of the present disclosure.

FIG. 2 is a block diagram illustrating an analog signal processor of a signal receiving device 100 of FIG. 1 according to an example embodiment of the present disclosure. An analog signal processor 110 of FIG. 1 may include an analog signal processor 200 in FIG. 2. The analog signal processor 200 may include a pseudo random noise code generator 230, a correlation operation calculator 250, an image remover 270, and an intermediate frequency converter 290.

The pseudo random noise code generator 230 may generate a pseudo random noise code which is used in correlation operation to be performed by the analog signal processor 200. As an example embodiment, the pseudo random noise code generator 230 may generate the pseudo random noise code according to the operation of a local oscillator having a specific chip rate. The pseudo random noise code generator 230 may output a signal (i.e., a pseudo random noise code signal) corresponding to the pseudo random noise code. As an example embodiment, in order to remove noise included in the pseudo random noise code signal, a low pass filter may be connected to the output terminal of the pseudo random noise code generator 230.

The correlation operation calculator 250 may receive a signal received by the signal receiving device 100. In addition, the correlation operation calculator 250 may receive the pseudo random noise code signal from the pseudo random noise code generator 230. The correlation operation calculator 250 may perform correlation operation on the received signal and the pseudo random noise code signal. The correlation operation calculator 250 may perform the correlation operation to generate a correlation operation result signal.

As described with reference to FIG. 1, the correlation operation result signal may include the effective correlation operation result signal which includes information intended to be obtained by the correlation operation. Furthermore, the correlation operation result signal may include narrowband distribution signals repeated at a certain frequency interval with the same frequency bandwidth as the effective correlation operation result signal. Some of the narrowband distribution signals may be interference signals for the effective correlation operation result signal. The interference signals may cause interference in an analog-digital conversion process. Thus, the intensity of an image signal having an image frequency causing interference in the analog-digital conversion process among the correlation operation result signal needs to be attenuated.

The image remover 270 may receive the correlation operation result signal from the correlation operation calculator 250. The image remover 270 may decrease the intensity of the image signal having the image frequency among the correlation operation result signal. The image remover 270 may generate a band-limited signal distributed in a narrower frequency band than the correlation operation result signal. That is, the band-limited signal may be generated by decreasing the intensity of the image signal having the image frequency among the correlation operation result signal.

The intermediate frequency converter 290 may receive the band-limited signal from the image remover 270. The intermediate frequency converter 290 may transform the band-limited signal based on a carrier frequency having an intermediate frequency. As mentioned with reference to FIG. 1, the intermediate frequency may be suitable for an analog-digital conversion. The intermediate frequency converter 290 may convert the band-limited signal to generate an intermediate frequency signal. The intermediate frequency converter 290 may output and provide the intermediate frequency signal to an analog-digital converter 130 (see FIG. 1).

Figure 3:
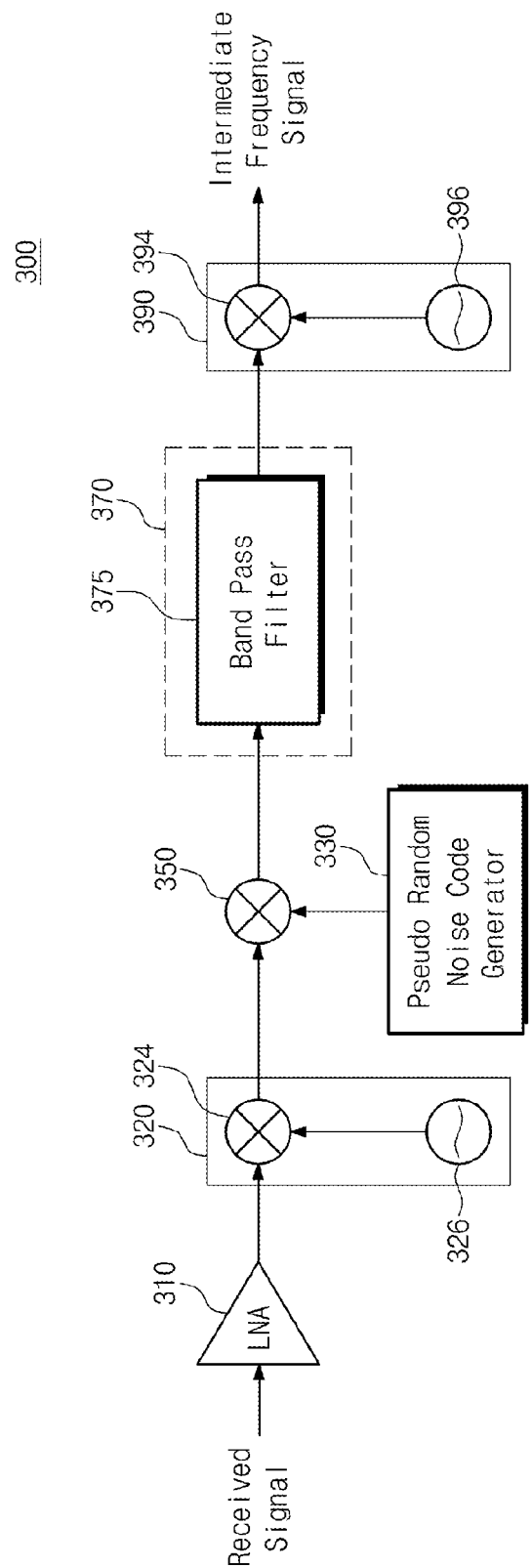
FIG. 3 is a block diagram illustrating an analog signal processor of a signal receiving device according to an example embodiment of the present disclosure.

FIG. 3 is a block diagram illustrating an analog signal processor of a signal receiving device 100 of FIG. 1 according to an example embodiment of the present disclosure. An analog signal processor 110 of FIG. 1 may include an analog signal processor 300 of FIG. 3. The analog signal processor 300 may include a low noise amplifier 310, a high frequency converter 320, a pseudo random noise code generator 330, a correlation operation calculator 350, an image remover 370, and an intermediate frequency converter 390.

As an example embodiment, the analog signal processor 300 may include the low noise amplifier 310. The intensity of a received signal (e.g., a signal received through an antenna ANT of FIG. 1) may be weakened during passing through a wireless communication channel. In addition, the received signal may be affected by noise during passing through the wireless communication channel. The low noise amplifier 310 may amplify the intensity of the received signal with inhibiting the amplification of noise included in the received signal.

As an example embodiment, the analog signal processor 300 may include the high frequency converter 320. The high frequency converter 320 may convert the frequency of the received signal. A wireless communication system may use a signal having a significantly high frequency in order to transmit and receive a signal through the wireless communication channel. That is, the received signal may have a significantly high frequency. In this case, the frequency of the received signal may be higher than a frequency processed by the correlation operation calculator 350. The high frequency converter 320 may convert the frequency of the received signal into the frequency processed by the correlation operation calculator 350. In addition, the high frequency converter 320 may output the received signal having the converted frequency.

As an example embodiment, the high frequency converter 320 may include an analog mixer 324 and a local oscillator 326. The analog mixer 324 may convert the frequency of the received signal according to the operation of the local oscillator 326.

The pseudo random noise code generator 330 may generate a pseudo random noise code used in correlation operation. The pseudo random noise code generator 330 may output a signal (i.e., pseudo random noise code signal) corresponding to the pseudo random noise code.

The correlation operation calculator 350 may receive the received signal having the converted frequency from the high frequency converter 320. In addition, the correlation operation calculator 350 may receive the pseudo random noise code signal from the pseudo random noise code generator 330. The correlation operation calculator 350 may perform correlation operation on the received signal and the pseudo random noise code signal. The correlation operation calculator 350 may perform the correlation operation to generate a correlation operation result signal. The description of the correlation operation result signal has been mentioned with reference to FIGS. 1 and 2.

As an example embodiment, the correlation operation calculator 350 may include an analog mixer. In this example embodiment, the correlation operation calculator 350 may perform multiplication operation on the received signal and the pseudo random noise code signal in a time domain. The multiplication operation in a time domain for two signals corresponds to the correlation operation in a frequency domain. An effective correlation signal included in the correlation operation result signal may include information associated with a result of the correlation operation performed on the received signal and the pseudo random noise code signal.

The image remover 370 may receive the correlation operation result signal from the correlation operation unit 350. The image remover 370 may decrease the intensity of an image signal having an image frequency among the correlation operation result signal. As an example embodiment, the image remover 370 may include a band pass filter 375. The band pass filter 375 may filter the image signal having the image frequency among the correlation operation result signal. The intensity of the image signal may decrease by the band pass filter 375. When the intensity of the image signal decreases, a band-limited signal may be generated.

As an example embodiment, the bandwidth of the band pass filter 375 may have a value corresponding to half a sampling frequency of an analog-digital converter 130 (see FIG. 1). However, the above example embodiment is only exemplary. The bandwidth of the band pass filter 375 may have any value suitable for decreasing the intensity of the image signal having the image frequency. That is, the above example embodiment is not intended to limit the present disclosure.

The band pass filter 375 in the example embodiment of the present disclosure does not need to have a high quality factor characteristic. The bandwidth of the band pass filter 375 in the example embodiment of the present disclosure only needs to have a value suitable for decreasing the intensity of the image signal having the image frequency. Thus, the signal receiving device 100 according to the example embodiment of the present disclosure may be easily implemented.

The intermediate frequency converter 390 may receive the band-limited signal from the image remover 370. The intermediate frequency converter 390 may convert the band-limited signal to generate an intermediate frequency signal. As mentioned with reference to FIGS. 1 and 2, the intermediate frequency signal may have an intermediate frequency suitable for an analog-digital conversion.

As an example embodiment, the intermediate frequency may be set to ¼ of the sampling frequency of the analog-digital converter 130. In other words, the sampling frequency of the analog-digital converter 130 may be four times the intermediate frequency. When the intermediate frequency has a value corresponding to ¼ of the sampling frequency of the analog-digital converter 130, the analog-digital conversion may be properly performed without interference caused by the image signal. However, the above example embodiment is only exemplary and not intended to limit the present disclosure. The intermediate frequency may have any value suitable for an analog-digital conversion.

As an example embodiment, the intermediate frequency converter 390 may include an analog mixer 394 and a local oscillator 396. The analog mixer 394 may convert a frequency of a narrowband distribution signal according to the operation of the local oscillator 396 to generate the intermediate frequency signal. The intermediate frequency converter 390 may output and provide the intermediate frequency signal to the analog-digital converter 130.

Figure 4:
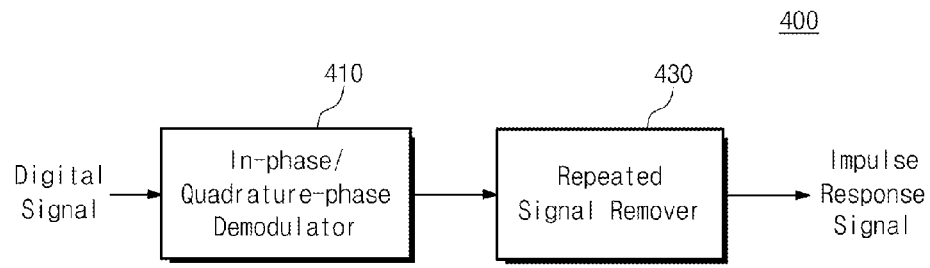
FIG. 4 is a block diagram illustrating a digital signal processor of a signal receiving device according to an example embodiment of the present disclosure.

FIG. 4 is a block diagram illustrating a digital signal processor of a signal receiving device 100 of FIG. 1 according to an example embodiment of the present disclosure. A digital signal processor 150 of FIG. 1 may include a digital signal processor 400 of FIG. 4. The digital signal processor 400 may include an in-phase/quadrature-phase demodulator 410 and a repeated signal remover 430.

The in-phase/quadrature-phase demodulator 410 may receive a digital signal from an analog-digital converter 130 (see FIG. 1). The in-phase/quadrature-phase demodulator 410 may demodulate the digital signal to generate a demodulated signal. In particular, the in-phase/quadrature-phase demodulator 410 may perform in-phase and quadrature-phase modulation on the digital signal to generate the demodulated signal. As mentioned with reference to FIG. 1, the demodulated signal may include a baseband signal including a DC component. Furthermore, the demodulated signal may include signals having the same frequency bandwidth as the baseband signal and repeated at constant frequency intervals.

The repeated signal remover 430 may receive the demodulated signal from the in-phase/quadrature-phase demodulator 410. The repeated signal remover 430 may decrease the intensities of other signals (i.e., the repeated signals) excluding the baseband signal among the demodulated signal. Accordingly, the repeated signal remover 430 may generate an impulse response signal. The impulse response signal may be used for measuring the characteristic of a wireless communication channel through which a signal received by the signal receiving device 100 passes.

Figure 5:
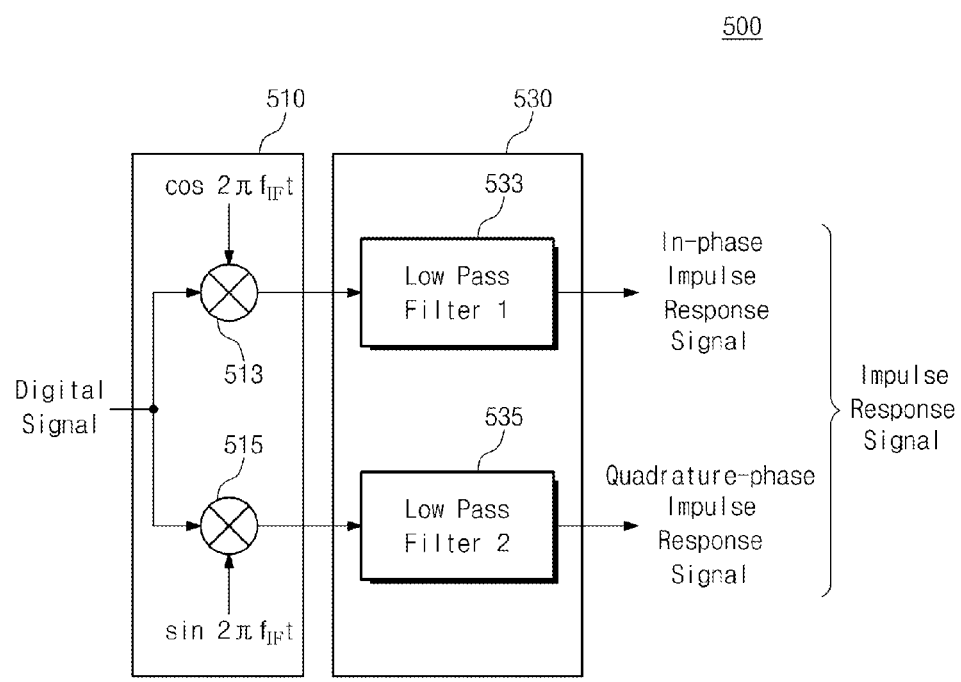
FIG. 5 is a block diagram illustrating a digital signal processor of a signal receiving device according to an example embodiment of the present disclosure.

FIG. 5 is a block diagram illustrating a digital signal processor of a signal receiving device 100 of FIG. 1 according to an example embodiment of the present disclosure. A digital signal processor 150 may include a digital signal processor 500 of FIG. 5. The digital signal processor 500 may include an in-phase/quadrature-phase demodulator 510 and a repeated signal remover 530.

The in-phase/quadrature-phase demodulator 510 may receive a digital signal from the analog-digital converter 130 (see FIG. 1). As an example embodiment, the in-phase/quadrature-phase demodulator 510 may include a first demodulator 513 and a second demodulator 515.

The first demodulator 513 may demodulate an in-phase component signal of the digital signal. The first demodulator 513 may demodulate the in-phase component signal based on an intermediate frequency $f_{IF}$. In particular, the first demodulator 513 may use the cosine value of the angular velocity for the intermediate frequency $f_{IF}$ in order to demodulate the in-phase component signal. The first demodulator 513 may demodulate the in-phase component signal of the digital signal to generate an in-phase demodulated signal. The in-phase demodulated signal may include an in-phase baseband signal having a specific frequency bandwidth (hereinafter, referred to as a "first frequency bandwidth") and including a first DC component. Furthermore, the in-phase demodulated signal may include first repeated signals which have the first frequency bandwidth equal to that of the in-phase baseband signal and are repeated at constant frequency intervals.

The second demodulator 515 may demodulate a quadrature-phase component signal of the digital signal. The second demodulator 515 may demodulate the quadrature-phase component signal based on the intermediate frequency $f_{IF}$. In particular, the second demodulator 515 may use the sine value of the angular velocity of the intermediate frequency $f_{IF}$ in order to demodulate the quadrature-phase component signal. The second demodulator 515 may demodulate the quadrature-phase component signal of the digital signal to generate a quadrature-phase demodulated signal. The quadrature-phase demodulated signal may include a quadrature-phase baseband signal having a specific frequency bandwidth (hereinafter, referred to as a "second frequency bandwidth") and including a second DC component. Furthermore, the quadrature-phase demodulated signal may include second repeated signals which have the second frequency bandwidth equal to that of the quadrature-phase baseband signal and are repeated at constant frequency intervals.

The repeated signal remover 530 may receive the in-phase demodulated signal and the quadrature-phase demodulated signal from the first modulator 513 and the second modulator 515 of the in-phase/quadrature-phase demodulator 510. As an example embodiment, the repeated signal remover 530 may include a first low pass filter 533 and a second low pass filter 535.

The first low pass filter 533 may receive the in-phase demodulated signal from the first demodulator 513. The first low pass filter 533 may filter other signals (i.e., the first repeated signals) excluding the in-phase baseband signal among the in-phase demodulated signal. That is, the first low pass filter 533 may pass the in-phase baseband signal among the in-phase demodulated signal. To achieve this, the first low pass filter 533 may be designed to have a narrow pass band characteristic. As a result, the first low pass filter 533 may decrease the intensities of the first repeated signals among the in-phase demodulated signal. Thus, the first low pass filter 533 may generate an in-phase impulse response signal.

The second low pass filter 535 may receive the quadrature-phase demodulated signal from the second demodulator 515. The first low pass filter 535 may filter other signals (i.e., the second repeated signals) excluding the quadrature-phase baseband signal among the quadrature-phase demodulated signal. That is, the second low pass filter 535 may pass the quadrature-phase baseband signal among the quadrature-phase demodulated signal. To achieve this, the second low pass filter 535 may be designed to have a narrow pass band characteristic. As a result, the second low pass filter 535 may decrease the intensities of the second repeated signals among the quadrature-phase demodulated signal. Thus, the second low pass filter 535 may generate a quadrature-phase impulse response signal.

The in-phase impulse response signal and the quadrature-phase impulse response signal may form an impulse response signal. The impulse response signal may be used for measuring the characteristic of a wireless communication channel through which a signal received by the signal receiving device 100 passes. The descriptions associated with the demodulated signal and the impulse response signal will be further mentioned with reference to FIGS. 6 to 8.

The signal receiving device 100 according to an example embodiment of the present disclosure may use a digital signal to perform in-phase and quadrature-phase demodulation. Thus, although the in-phase component signal is transmitted through a different path from the quadrature-phase component signal, the influence of errors in signal amplitude and phase may decrease. When using the signal receiving device 100 according to an example embodiment of the present disclosure, it is possible to design a more accurate wideband wireless communication channel model.

Figure 6:
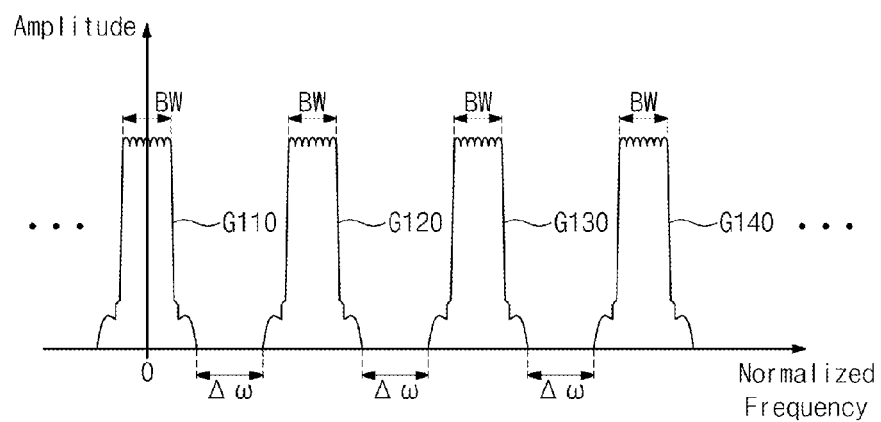
FIG. 6 is a graph describing a demodulated signal in a frequency domain according to an example embodiment of the present disclosure.

FIG. 6 is a graph describing a demodulated signal in a frequency domain according to an example embodiment of the present disclosure. A demodulated signal generated by in-phase and quadrature-phase demodulation may include signals G110 to G140, which have the same frequency bandwidth BW and are repeated at constant frequency intervals $\Delta\omega$. That is, the demodulated signal generated by the in-phase and quadrature-phase demodulation may include signals corresponding to multiple frequency components having different values. The demodulated signal including signals corresponding to the multiple frequency components having different values may have such a form as described in FIG. 7 in a time domain.

Figure 7:
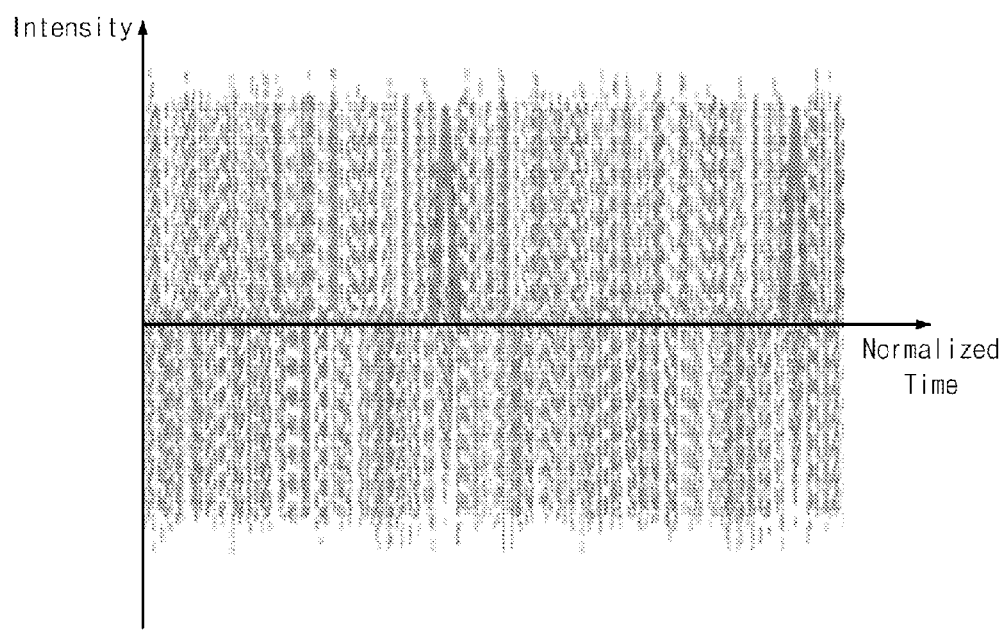
FIG. 7 is a graph describing a demodulated signal in a time domain according to an example embodiment of the present disclosure.

FIG. 7 is a graph describing a demodulated signal in a time domain according to an example embodiment of the present disclosure. As shown in FIG. 7, the demodulated signal including signals corresponding to multiple frequency components having different values may seem to be distorted in a time domain. That is, it is difficult to use the demodulated signal generated by in-phase and quadrature-phase demodulation for measuring the characteristic of a wireless communication channel through which a signal received by a signal receiving device 100 (see FIG. 1) passes. In order to properly measure the characteristic of the wireless communication channel through which the signal received by the signal receiving device 100 passes, it is necessary to decrease the intensities of the signals corresponding to the multiple frequency components having different values included in the demodulated signal.

Referring back to FIG. 6, from among signals G110 to G140 having the same frequency bandwidth BW and repeated in each of different frequency regions, a signal G110 corresponding to a frequency region having the lowest value may be a baseband signal. As shown in FIG. 6, the demodulated signal may include signals G120 to G140 having the same frequency bandwidth BW as the baseband signal G110 and repeated at constant frequency intervals $\Delta\omega$. Other signals G120 to G140 excluding the baseband signal G110 may be interference signals generated in a correlation operation process. Thus, the intensities of other signals G120 to G140 excluding the baseband signal G110 need to decrease in order to properly measure the characteristic of a wireless communication channel through which a signal received by the signal receiving device 100 passes.

A first low pass filter 533 (see FIG. 5) and a second low pass filter 535 (see FIG. 5) may pass the baseband signal G110. On the other hand, the first low pass filter 533 and the second low pass filter 535 may decrease the intensities of other signals G120 to G140 excluding the baseband signal G110. Accordingly, an impulse response signal used for measuring the characteristic of the wireless communication channel through which the signal received by the signal receiving device 100 passes may be generated. The impulse response signal may have such a form as described in FIG. 8 in a time domain.

Figure 8:
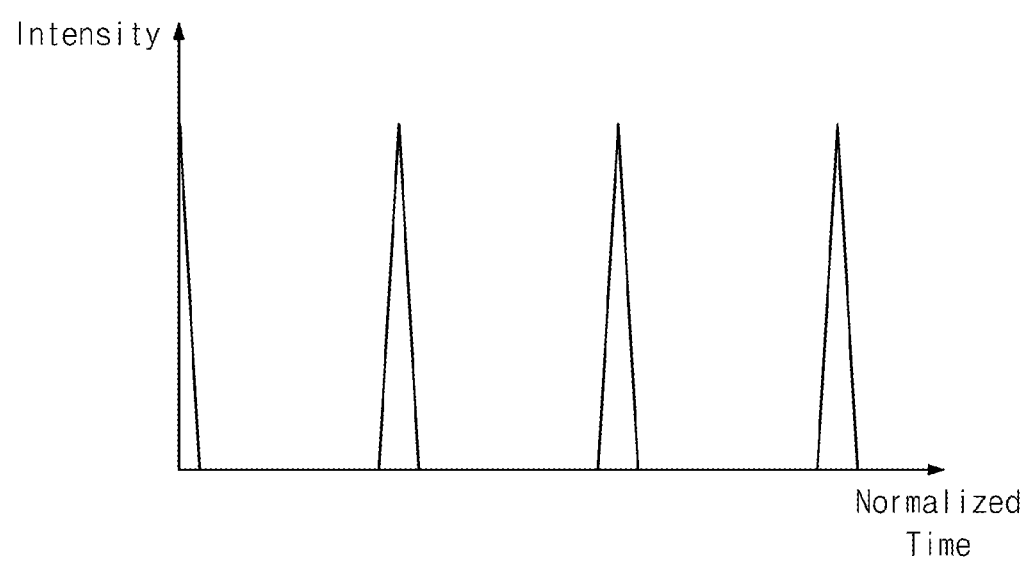
FIG. 8 is a graph describing an impulse response signal in a time domain according to an example embodiment of the present disclosure.

FIG. 8 is a graph describing an impulse response signal in a time domain according to an example embodiment of the present disclosure. By decreasing the intensities of other signals excluding the baseband signal among the demodulated signal, the impulse response signal may include a signal corresponding to one frequency region. As a result, the impulse response signal may include pulse signals periodically repeated in a time domain, as shown in FIG. 8. By observing the impulse response signal, the characteristic of the wireless communication channel through which the signal received by the signal receiving device 100 passes may be measured. Based on a result of measurement, a wireless communication channel model may be designed.

However, the signals shown in FIGS. 6 to 8 are not intended to limit the present disclosure. It is obvious that the demodulated signal and the impulse response signal may have different forms from those shown in FIGS. 6 to 8. The forms of the signals shown in FIGS. 6 to 8 are only examples to help understanding the present disclosure.

FIG. 9 is a flowchart describing a method of measuring the characteristic of a wireless communication channel according to an example embodiment of the present disclosure.

In operation S110, a signal for measuring the characteristic of the wireless communication channel may be received, for instance, by a signal receiving device 100 of FIG. 1. Further, in operation S110, a signal corresponding to a pseudo random noise code may be generated, for instance, by a pseudo random noise code generator 230 of FIG. 2.

In operation S120, a correlation operation may be performed, for instance, by a correlation operation calculator 250 of FIG. 2. The correlation operation may be performed on the signal received in operation S110 and the pseudo random noise code signal generated in operation S110. As a result of correlation operation, a correlation operation result signal may be generated. The correlation operation result signal may include an effective correlation signal. The effective correlation signal includes information intended to be obtained by the correlation operation. Furthermore, the correlation operation result signal may include narrowband distribution signals repeated at constant frequency intervals with the same frequency bandwidth as the effective correlation signal. Some of the narrowband distribution signals may be interference signals for the effective correlation signal. The interference signals may cause interference in an analog-digital conversion process of operation S150. The intensity of an image signal having an image frequency causing interference in the analog-digital conversion process needs to be attenuated.

In operation S130, the intensity of the image signal having the image frequency among the correlation operation result signal generated in operation S120 may decrease, for instance, by an image remover 270 of FIG. 2. Accordingly, a possibility to cause the interference in the analog-digital conversion process of operation S150 may decrease. When the intensity of the image signal having the image frequency among the correlation operation result signal generated in operation S120 decreases, a band-limited signal including the effective correlation signal may be generated. However, the frequency of the band-limited signal may not be suitable for the analog-digital conversion.

In operation S140, an intermediate frequency signal may be generated, for instance, by an intermediate frequency converter 290 of FIG. 2. The intermediate frequency signal may be generated by converting the frequency of the band-limited signal generated in operation S130. The intermediate frequency signal has an intermediate frequency suitable for the analog-digital conversion. For instance, when the frequency of the band-limited signal is too high and thus not suitable for the analog-digital conversion, the band-limited signal may be converted into the intermediate frequency signal based on a carrier frequency having the intermediate frequency.

In operation S150, the intermediate frequency signal generated in operation S140 may be converted into a digital signal, for instance, by an analog-digital converter 130 of FIG. 1. That is, in-phase and quadrature-phase demodulation may be performed by using the digital signal in an example embodiment of the present disclosure.

In operation S160, a demodulated signal may be generated, for instance, by an in-phase/quadrature-phase demodulator 410 of FIG. 4. The demodulated signal may be generated by the in-phase and quadrature-phase demodulation based on the digital signal converted in operation S150. The demodulated signal may include a baseband signal including a DC component. Furthermore, the demodulated signal may include repeated signals, which are repeated at constant frequency intervals with the same frequency bandwidth as the baseband signal. In particular, according to the in-phase and quadrature-phase demodulation, a signal corresponding to the intermediate frequency may be demodulated to a signal corresponding to the DC component included in the baseband signal. In addition, the baseband signal may be generated to include information corresponding to the effective correlation signal. The description associated with the demodulated signal has been mentioned with reference to FIGS. 6 and 7.

In operation S170, an impulse response signal may be generated, for instance, by a repeated signal remover 430 of FIG. 4. The impulse response signal may be generated by decreasing the intensities of other signals (i.e., the repeated signals) excluding the baseband signal among the demodulated signal generated in operation S160. The impulse response signal may be used for measuring the characteristic of a wireless communication channel. The descriptions associated with the impulse response signal have been mentioned with reference to FIGS. 6 and 8.

The signal receiving device according to an example embodiment of the present disclosure may be implemented with a filter having a relatively lower quality factor characteristic than another device. Thus, the signal receiving device according to an example embodiment of the present disclosure may be more easily implemented comparing to another device. In addition, according to an example embodiment of the present disclosure, the in-phase and quadrature-phase demodulation may be performed by using a digital signal. Accordingly, the influence of errors in signal amplitude and phase may decrease, comparing to using an analog signal. When using the signal receiving device and the method of measuring the characteristic according to example embodiments of the present disclosure, it is possible to design a more accurate wideband wireless communication channel model.

The configuration of the device shown in each block diagram intends to help the understanding of the present disclosure. Each block may include smaller unit blocks according to a function. Alternatively, a plurality of blocks may form a larger unit block according to functions. That is, the present disclosure is not limited to the components shown in each block diagram.

The present disclosure has been described above based on example embodiments. However, due to the characteristic of the technical field to which the present disclosure pertains, an object to be achieved by the present disclosure may be achieved in different forms from the above example embodiments that include the subject matter of the present disclosure. Thus, the above example embodiments should be understood in illustrative aspect, not in a limitative aspect. That is, it should be construed that a technical spirit that may include the subject matter of the present disclosure and achieve the object of the present disclosure is included in the technical spirit of the present disclosure.

Thus, a technical spirit modified or changed without departing from the essential characteristic of the present disclosure is included in the protective scope claimed by the present disclosure. Also, the protective scope of the present disclosure is not limited to the above example embodiments.

What is claimed is:

1. A signal receiving device configured to measure a characteristic of a wireless communication channel, the signal receiving device comprising:
   an analog signal processor configured to:
      generate a band-limited signal by decreasing an intensity of an image signal having an image frequency, the image signal being included in a correlation operation result signal, the correlation operation result signal being a result of correlation operation performed on a received signal and a pseudo random noise code signal, and
      generate an intermediate frequency signal by transforming the band-limited signal based on a carrier frequency having an intermediate frequency;
   an analog-digital converter configured to convert the intermediate frequency signal into a digital signal; and
   a digital signal processor configured to:
      generate a demodulated signal by performing in-phase and quadrature-phase demodulation on the digital signal, the demodulated signal including a baseband signal and repeated signals, the baseband signal including a direct current (DC) component, the repeated signals being repeated at constant frequency intervals with a same bandwidth as the baseband signal, and
      generate an impulse response signal by decreasing intensities of the repeated signals in the demodulated signal.

2. The signal receiving device of claim 1, wherein the correlation operation result signal comprises an effective correlation operation result signal and narrowband distribution signals, the narrowband distribution signals being repeated at constant frequency intervals with a same bandwidth as the effective correlation operation result signal, and
   wherein the band-limited signal comprises the effective correlation operation result signal.

3. The signal receiving device of claim 2, wherein according to the in-phase and quadrature-phase demodulation, a signal corresponding to the intermediate frequency is demodulated to a signal corresponding to the DC component included in the baseband signal, and
   wherein the baseband signal comprises information corresponding to the effective correlation operation result signal.

4. The signal receiving device of claim 1, wherein the analog signal processor comprises:
   a pseudo random noise code generator configured to generate the pseudo random noise code signal;
   a correlation operation calculator configured to perform the correlation operation on the received signal and the pseudo random noise code signal to generate the correlation operation result signal;
   an image remover configured to generate the band-limited signal by decreasing the intensity of the image signal in the correlation operation result signal; and
   an intermediate converter configured to transform the band-limited signal to generate the intermediate frequency signal.

5. The signal receiving device of claim 4, wherein the analog signal processor further comprises:
   a high frequency converter configured to convert a first frequency of the received signal into a second frequency processed by the correlation operation calculator to provide the received signal having the second frequency to the correlation operation calculator when the first frequency of the received signal is higher than the second frequency.

6. The signal receiving device of claim 4, wherein the image remover comprises a band pass filter configured to filter the image signal.

7. The signal receiving device of claim 6, wherein a bandwidth of pass band of the band pass filter has a value corresponding to half a sampling frequency of the analog-digital converter.

8. The signal receiving device of claim 1, wherein a sampling frequency of the analog-digital converter is four times the intermediate frequency.

9. The signal receiving device of claim 1, wherein the digital signal processor comprises:
   an in-phase/quadrature-phase demodulator configured to perform in-phase and quadrature-phase demodulation on the digital signal to generate the demodulated signal; and
   a repeated signal remover configured to decrease the intensities of the repeated signals in the demodulated signal to generate the impulse response signal.

10. The signal receiving device of claim 9, wherein the in-phase/quadrature-phase demodulator comprises:
    a first demodulator configured to demodulate an in-phase component signal among the digital signal to generate an in-phase demodulated signal, the in-phase demodulated signal including an in-phase baseband signal and first repeated signals, the in-phase baseband signal having a first frequency bandwidth and including a first DC component, the first repeated signals being repeated at constant frequency intervals with the first frequency bandwidth; and
    a second demodulator configured to demodulate a quadrature-phase component signal among the digital signal to generate a quadrature-phase demodulated signal, the quadrature-phase demodulated signal including a quadrature-phase baseband signal and second repeated signals, the quadrature-phase baseband signal having a second frequency bandwidth and including a second DC component, the second repeated signals being repeated at constant frequency intervals with the second frequency bandwidth.

11. The signal receiving device of claim 10, wherein the repeated signal remover comprises:
    a first low pass filter configured to filter the in-phase baseband signal among the in-phase demodulated signal to generate an in-phase impulse response signal; and
    a second low pass filter configured to filter the quadrature-phase baseband signal among the quadrature-phase demodulated signal to generate a quadrature-phase impulse response signal.

12. The signal receiving device of claim 11, wherein the impulse response signal comprises the in-phase impulse response signal and the quadrature-phase impulse response signal.

13. A method of measuring a characteristic of a wireless communication channel, the method comprising:
    receiving a signal for characteristic measurement;
    generating a pseudo random noise code signal;

performing correlation operation on the received signal and the pseudo random noise code signal to generate a correlation operation result signal;

decreasing an intensity of an image signal having an image frequency to generate a band-limited signal, the image signal being included in the correlation operation result signal;

transforming the band-limited signal based on a carrier frequency having an intermediate frequency to generate an intermediate frequency signal;

converting the intermediate frequency signal into a digital signal;

performing in-phase and quadrature-phase demodulation on the digital signal to generate a demodulated signal, the demodulated signal including a baseband signal and repeated signals, the baseband signal including a direct current (DC) component, the repeated signals being repeated at constant frequency intervals with a same bandwidth as the baseband signal; and decreasing intensities of the repeated signals in the demodulated signal to generate an impulse response signal.

14. The method of claim 13, wherein the correlation operation result signal includes an effective correlation operation result signal and narrowband distribution signals, the narrowband distribution signals being repeated at constant frequency intervals with a same bandwidth as the effective correlation operation result signal, and wherein the band-limited signal comprises the effective correlation operation result signal.

15. The method of claim 14, wherein according to the in-phase and quadrature-phase demodulation, a signal corresponding to the intermediate frequency is demodulated to a signal corresponding to the DC component included in the baseband signal, and wherein the baseband signal comprises information corresponding to the effective correlation operation result signal.

* * * * *